UNITED STATES PATENT OFFICE.

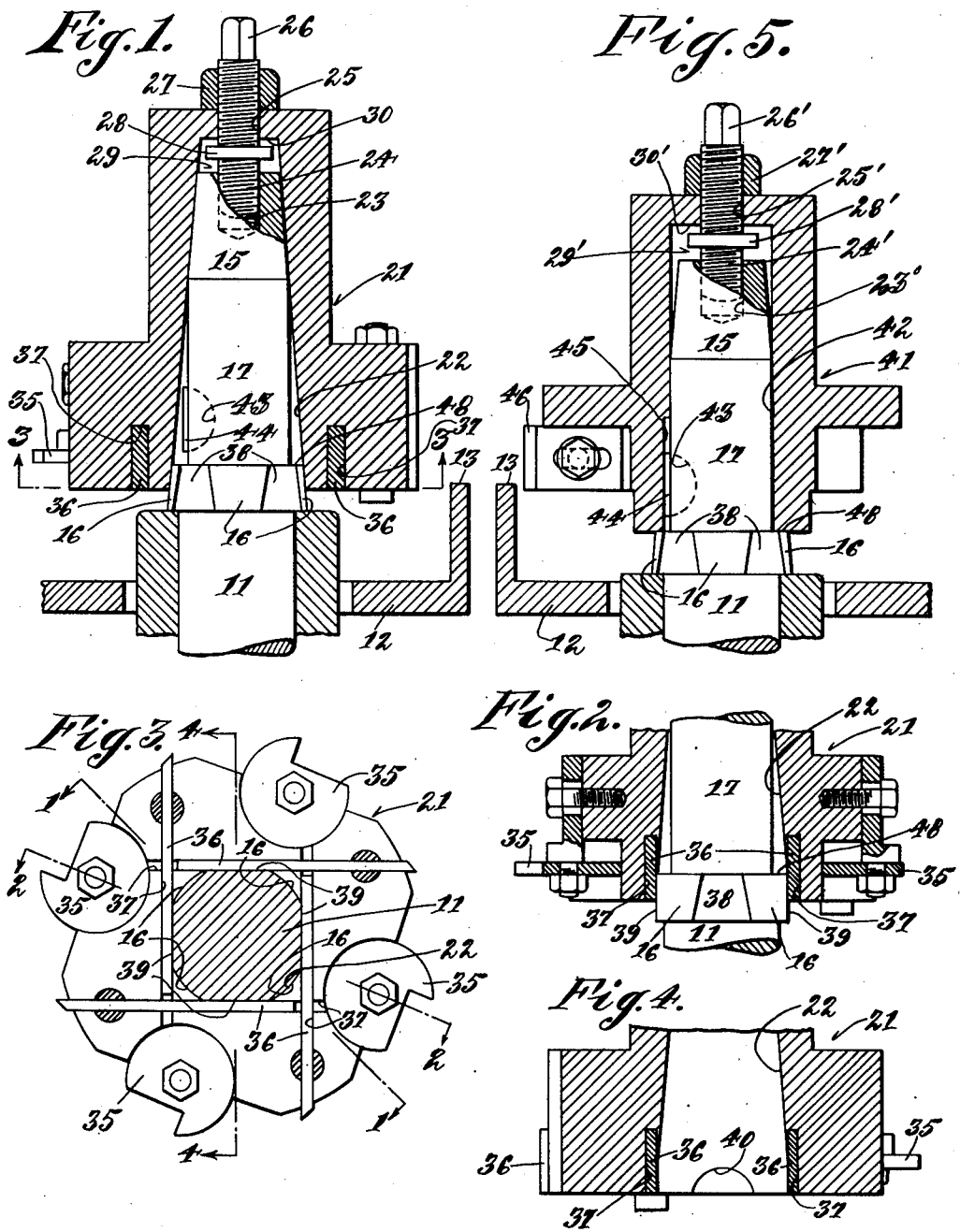

PETER A. SOLEM, OF CINCINNATI, OHIO, ASSIGNOR TO J. A. FAY & EGAN COMPANY, OF CINCINNATI, OHIO, A CORPORATION OF WEST VIRGINIA.

CUTTER-HEAD-SECURING MEANS.

1,056,466.

Specification of Letters Patent.

Patented Mar. 18, 1913.

Application filed March 29, 1912. Serial No. 687,134.

*To all whom it may concern:*

Be it known that I, PETER A. SOLEM, a citizen of the United States, residing at Cincinnati, in the county of Hamilton and State of Ohio, have invented certain new and useful Improvements in Cutter-Head-Securing Means, of which the following is a specification.

My invention relates to cutter-head securing means, especially to securing means for securing so-called side-heads to their spindles, in wood-working machinery, and it has for its object the provision of means whereby cutter-heads having tapering bores and cutter-heads having cylindrical bores may be interchangeably secured to the spindle.

The invention consists in providing the spindle with an interrupted taper portion and with a parallel-sided portion in said interruption, and in providing means whereby a cutter-head having a taper bore or a cutter-head having a cylindrical bore may be selectively or interchangeably secured to said spindle.

The invention will be readily understood from the following description and claims, and from the drawing, in which latter:

Figure 1 is an axial section of my improved device shown in connection with a cutter-head having a taper bore, taken on a line corresponding to the line 1—1 of Fig. 3. Fig. 2 is a similar section, partly broken away taken on a line corresponding to the line 2—2 of Fig. 3. Fig. 3 is a cross-section of the same taken on a line corresponding to the line 3—3 of Fig. 1. Fig. 4 is a detail section on the line 4—4 of Fig. 3; and, Fig. 5 is an axial section showing my improved device employed in securing a cutter-head having a straight or cylindrical bore to the spindle.

In wood-working machinery employing cutter-heads for cutting the edge of stock, such for instance as the side-heads of planing and matching machines, flooring machines, and the like, if the cutter-heads are rotated at high speeds and the work fed through the machine at high rates of feed in order to utilize the possibilities of high speed steel, and the cutters are composed of such steel, it has been found advisable to provide a taper joint between the spindle and the cutter-head when maintaining high speeds, so as to locate the spindle and the cutter-head as nearly as possible in true axial lines with each other for causing each cutter to, as far as possible, do its proportion of the cutting. It frequently occurs also that it is desirable to employ cutter-heads not provided with taper bores and which are not intended to be rotated at the high speeds provided for said high speed cutter-heads. It is desirable however, to secure both classes of cutter-heads interchangeably upon the same spindle. The attempt has heretofore been made to accomplish this end by providing a spindle with a cylindrical portion which is arranged to receive a sleeve having a cylindrical bore and a tapering periphery, the sleeve being slit partway of its length and arranged to be forced longitudinally between the cylindrical spindle-portion and the tapering wall of a taper bore in the cutter-head. This construction has however been found objectionable for the reason that a true axial alinement between the spindle, the sleeve and the cutter-head could not be insured in practice, and it has been found that if in such last-named construction the cutter-head is loosened for any attention and then again tightened, the same relation of the various cutting edges of the cutter-blades is not present as previous to such attention, owing primarily to the presence of the cylindrically bored sleeve in the taper bore of the cutter-head and to the multiplicity of joints. I avoid these objections by my improved device in which I am enabled to insure true axial relation between the spindle and the cutter-head when employing a taper-bore head, and am also enabled to employ the spindle in connection with cylindrically bored heads.

11 represents the spindle, preferably the side spindle, of a wood-working machine, which may be provided with means for adjusting the same up and down and laterally with relation to the stock-supporting bed, indicated at 12, the stock-supporting face of which is shown at 13, along which the stock is fed by suitable power feeding means, the adjusting means for the spindle and the feeding means not being shown because well known.

The spindle is provided, preferably at its end, with an interrupted taper face and a parallel-sided portion in said interruption. Thus 15, 16, represent spaced-apart taper portions of the spindle, and 17 a cylindrical portion between said spaced-apart taper portions, the parts being located in succession lengthwise of the spindle. The angles of the tapers of the taper portions 15, 16, are preferably coincident, that is, the tapering faces in any given radial plane of the spindle parallel with the axis of the spindle, are parallel to each other, so that a cutter-head having a taper bore of similar angle or parallel interior taper may have its taper wall fit both the taper portions 15, 16. Thus 21 is a cutter-head having a taper bore 22, the angle of which coincides with the angle of the taper portions 15, 16, of the spindle.

For securing the cutter-head 21 in place upon the spindle and forming intimate contact between the wall of the taper bore thereof and the interrupted taper faces of the spindle, I provide the end of the spindle with a screw-threaded bore 23 arranged to receive a screw 24. The end of the cutter-head is provided with a hole 25 through which the screw is received, the hole being a smooth hole in which the screw may have longitudinal movement without having threaded connection. The screw is provided with a polygonal head 26 of no greater diameter than the diameter of the hole 25.

27 is a nut threaded about the screw.

The screw is arranged to be threaded into the screw-threaded hole 23, the cutter-head placed over the interrupted taper faces and about the screw, and the nut 27 threaded about the screw for forcing the wall of the taper bore of the cutter-head intimately upon the taper faces of the spindle, and centering the head upon the spindle in such manner as to prevent lateral play between the head and the spindle irrespective of the force of blows that may be imparted to the cutter-head in the cutting operation. The screw is provided with a collar 28 which is received in a space 29 between the end of the spindle and the end of the bore in the cutter-head and is arranged, when it is desired to remove the cutter-head, to contact the end wall 30 of the cutter-head bore for forcing the cutter-head lengthwise away from the spindle.

35, 35, are cutter-blades extending laterally of the cutter-head, these blades being of suitable form, dependent on the work being performed, and secured in suitable manner to the head.

The cutter-head may if desired be provided with end knives 36 located in planes parallel to axial planes of the spindle and secured by suitable means in end grooves 37 of the cutter-head. The inner taper portion 16 of the spindle may be provided with recesses 38, shown as forming flat faces 39 in the cross-sectional plane of said inner taper portion. The inner ends of the knives 36 are received in said recesses and are positioned by said faces 39 for preventing turning of the head on the spindle. The grooves 37 are shown as intersecting a portion of the wall of the taper bore of the cutter-head, as shown at 40.

41 is a cutter-head provided with a cylindrical bore 42 arranged to be received about the cylindrical portion 17 of the cutter-head spindle. This cylindrical portion of the cutter-head spindle is preferably provided with a slot 43 for receiving a key 44 which is also partially received in a slot 45 of the cutter-head 41. The cutter-head 41 is arranged to be suitably secured to the spindle, as in manner similar to the securing means for the cutter-head 21, the parts being indicated by similar but primed reference numerals. The cutter-head 41 is provided with suitable laterally extending cutter-blades 46.

The cutter-head 41 is instanced as one of the forms of cutter-head which it is desirable to use in the relation stated, although other forms of cutter-heads may be employed.

When employing a cutter-head with a cylindrical bore, its inner end is received upon a shoulder 48 formed between the cylindrical portion 17 and the inner taper portion 16.

By the employment of my invention it is possible to sharpen the knives on a cutter-head having a taper bore, upon a machine independent of the wood-working machine, and to then secure the cutter-head so treated upon the spindle of the wood-working machine, with the assurance that the cutting edges of its cutters are in true axial coincidence with the axis of the spindle, so that all cutters will cut equally. At the same time provision is made for securing a cutter-head having a cylindrical bore to the same spindle in place of the cutter-head having the taper bore. The cutters on each of the cutter-heads are located in cross-plane with the parallel-sided portion of the spindle when said heads are respectively secured to the spindle.

Having thus fully described my invention, what I claim as new and desire to secure by Letters Patent, is:

1. In means for securing cutter-heads having different kinds of bores on the same cutter-head spindle, the combination of a cutter-head spindle having an interrupted taper face and a cylindrical portion in said interruption, a cutter-head provided with a taper bore arranged to be received on said interrupted taper face, and a cutter-head having a straight bore arranged to be received over said cylindrical portion.

2. In means for securing cutter-heads having different kinds of bores on the same cutter-head spindle, the combination of a cutter-head spindle having an interrupted taper face and a cylindrical portion and shoulder in said interruption, a cutter-head provided with a taper bore arranged to be received over said interrupted taper face, and a cutter-head having a straight bore arranged to be received over said cylindrical portion and seated by said shoulder.

3. In means for securing cutter-heads having different kinds of bores on the same cutter-head spindle, the combination of a cutter-head spindle having an interrupted taper portion and a parallel-sided portion in said interruption between the ends of said taper portion, said portions arranged in succession lengthwise of said spindle, and cutter-heads arranged to be received about said interrupted taper portion and said parallel-sided portion of said spindle respectively.

4. In means for securing cutter-heads having different kinds of bores on the same cutter-head spindle, the combination of a cutter-head spindle having an interrupted taper portion and a parallel-sided portion and a shoulder in said interruption, said portions arranged in succession lengthwise of said spindle, a cutter-head having a straight bore received over said parallel-sided portion and positioned by said shoulder, and a cutter-head having a taper bore received over said interrupted taper portion, substantially for the purpose specified.

5. In means for securing cutter-heads having different kinds of bores on the same cutter-head spindle, the combination of a cutter-head spindle having a plurality of spaced-apart taper portions and a parallel-sided portion therebetween arranged in succession lengthwise of said spindle, a cutter-head having a straight bore, and a cutter-head having a taper bore, each of said cutter-heads provided with laterally extending cutters, said laterally extending cutters and said parallel-sided portion of said spindle located in coincident planes extending at right angles to the axis of rotation of said spindle when said cutter-heads are located on said spindle.

6. In means for securing cutter-heads having different kinds of bores on the same cutter-head spindle, the combination of a cutter-head spindle having a plurality of spaced-apart taper portions and a parallel-sided portion therebetween arranged in succession lengthwise of said spindle, a cutter-head having a taper bore received over said plurality of spaced-apart taper portions of said spindle, and laterally extending cutters on said cutter-head in the cross-plane of said straight portion of said spindle.

7. In cutter-head securing means, the combination of a spindle and a cutter-head, said spindle having a taper portion provided with flat faces and said cutter-head provided with a taper bore the taper wall of which coacts with said taper portion of said spindle, and knives on said cutter-head coacting with said flat faces, for the purpose described.

8. In cutter-head securing means, the combination of a spindle, a cutter-head, and cutter-blades on said cutter-head, said cutter-head having a taper bore, and said spindle having a taper portion provided with recesses, said taper portion received in said bore and said cutter-blades received in said recesses.

9. In means for securing cutter-heads having different kinds of bores on the same cutter-head spindle, the combination of a cutter-head spindle having a plurality of spaced-apart taper portions and a parallel-sided portion therebetween arranged in succession lengthwise of said spindle, a cutter-head having a straight bore in which said parallel-sided portion of said spindle is received, a cutter-head having a taper bore in which said taper portions of said spindle are received, and locking means for said first-named cutter-head at said straight portion of said spindle located within the taper of said taper bore.

10. In a wood-working machine, the combination with a bed having a stock-supporting surface, of a side-head spindle provided with a taper portion normally located substantially in the horizontal plane of said stock-supporting surface and extending below said plane and with a parallel-sided portion normally located substantially in the horizontal plane of said stock-supporting surface and extending above said plane, and side cutter-heads respectively having bores received about said respective spindle portions, and means for securing said side cutter-heads to said spindle.

11. In a wood-working machine, the combination with a bed having a stock-supporting surface, of a side-head spindle having a taper portion and a parallel-sided portion with a shoulder between said portions, said shoulder normally located substantially in the horizontal plane of said stock-supporting surface, a side cutter-head having a taper bore received about said taper portion, a side cutter-head having a parallel-sided bore received about said parallel-sided portion and positioned by said shoulder, and means for securing said side cutter-heads to said spindle.

12. In a wood-working machine, the combination with a bed having a stock-supporting surface, of a side-head spindle having spaced-apart taper portions and a cylindrical portion therebetween arranged one above another lengthwise of said spindle, the adjacent ends of said cylindrical portion and said lower taper portion being normally located in substantially the horizontal plane of said stock-supporting surface, and side cutter-heads respectively having bores received about said taper spindle-portions and said cylindrical spindle-portion respectively, and means for securing said side cutter-heads to said spindle.

In testimony whereof, I have hereunto signed my name in the presence of two subscribing witnesses.

PETER A. SOLEM.

Witnesses:
CHARLES WEBER,
THERESA SILBER.